Patented Jan. 28, 1941

2,230,121

UNITED STATES PATENT OFFICE 2,230,121

SYNTHETIC RESINS

Fritz Pollak, Brussels, Belgium

No Drawing. Application April 20, 1938, Serial No. 203,197. In Austria February 4, 1938

5 Claims. (Cl. 260—69)

This invention relates to synthetic resins, molding compositions containing such resins, and methods of manufacturing these products.

When urea is treated with ammonia in aqueous solution the ammonia contained in the solution remains unaltered even after heating for hours, and may consequently be recovered by distilling off.

On the other hand I have made the surprising discovery that when ammonia is reacted with addition products of formaldehyde on urea the ammonia becomes chemically combined and is thus no longer present in a free state in the solution. In this manner there are evolved new compounds of urea derivatives with ammonia. These products are of a resinous nature, are readily soluble in a wide range of solvents, and form thereby more or less viscous solutions. By further heating, these products may be converted under certain circumstances into insoluble resins. If monomethylol urea is used as the starting material a certain amount of formaldehyde must be added before hardening if an insoluble final product is to be obtained.

The conversion with ammonia according to the invention may be carried out either in the heat or without heating. In the latter case the mixture of the two components in an aqueous solution is shaken or stirred thoroughly for a certain length of time, whereupon an exothermic reaction sets in. Afterwards the solutions contains only traces of free ammonia.

Irrespective of whether this reaction proceeds in the cold or in the heat such aqueous solutions of the reaction products are of alkaline reaction and smell slightly of ammonia, and that to a higher degree the more dilute they are, since owing to the water a partial dissociation of the newly evolved compound takes place.

For the purpose of manufacturing the resins according to the invention it is not absolutely necessary to proceed from the substitution products of urea. The procedure may also be such that the substitution product concerned is evolved intermediately in one and the same working operation, and at the same time the introduction of ammonia is effected. This may be done for example by reacting hexamethylene tetramine on urea in aqueous solution in the heat. At boiling temperature the hexamethylene tetramine then parts very gradually with its methylene groups, while at the same time ammonia is liberated and reacts, in statu nascendi, on the methylol urea. In this method of practising the process according to the invention, however, the following points must be carefully observed:

(1) Not more than one methylene group must be employed per molecule of urea. If more is used there results an undesirable secondary product which absorbs water and carbon dioxide from the air, and which causes the intermediate products obtained to deliquesce on exposure to the air and to become unstable. If smaller proportions of hexamethylene tetramine are used only imperfectly converted products are obtained.

(2) Similar undesirable secondary products may also result if ammonia is allowed to act on the reaction products for an excessively long time in the heat. It is therefore advisable to remove from the solution as soon as possible all ammonia not chemically combined.

(3) The amount of ammonia given off may only be just so much that for two mols of urea there is supplied one mol of ammonia. Both more and also less thereof leads to the obtaining of products of poorer quality.

The resinous products obtained in accordance with the invention are suitable for use in the manufacturing of molding compositions, such as hot pressing and molding powders, and also of varnish and lacquer bases, binding agents, vulcanizing accelerators, and emulsifying agents.

Examples (1) 45 parts by weight of monomethylol urea and 60 parts by weight of dimethylol urea are dissolved in 155 parts of water, and this solution heated with 3 parts by weight of ammonia (100% strong) for four hours under reflux condenser. If the quantity of ammonia given off during this process be determined it will be found that a total loss of about 0.096 part by weight of ammonia has occurred. The resulting reaction liquid, which smells slightly of ammonia, can be worked up, after cooling, into an excellent moldable resin. For this purpose there are added to the solution 75 parts by volume of 40% formaldehyde, 45.32 parts by weight of a dimethylol thiourea, and suitable quantities of filler, after which the mix is dried and ground to powder.

(2) 2.9 parts by weight of ammonia (100% strong) are reacted in the cold on 90 parts by weight of monomethylol urea in 115 parts of water, the solution being vigorously shaken. Spontaneous generation of heat occurs. After the reaction has proceeded for about an hour the conversion is complete. 75 parts by volume of 40% formaldehyde are then added, and boiling continued until the solution becomes neutral, after which there are added further 75 parts by volume of 40% formaldehyde, 45.33 parts by weight of a dimethylol thiourea, and the remaining usual additions. After drying and grinding this mixture there is obtained a powder which is highly satisfactory for molding in the heat.

(3) 120 parts by weight of urea are boiled with 46.67 parts of hexamethylenetetramine and 100 parts of water, under reflux condensing, until the vigorous giving off of ammonia ceases, which occurs after about three hours. By distilling off, with replacement of the water thereby driven off, there is then removed from the solution such further quantity of ammonia that in all 17 parts by weight thereof have been eliminated. To the residue there are added the solution of a dimethylolthiourea prepared from 50.67 parts by weight of thiourea, and the usual additions, and in this manner there is obtained a synthetic resin powder which is resistant to boiling, and which has excellent flowing properties in the hot press.

I claim:

1. In a process for the manufacture of water soluble hardenable urea resins the step of reacting methylol ureas in the presence of water with a substance selected from a group consisting of ammonia and hexamethylene tetramine under the provision that approximately 3 parts by weight of ammonia per one mol weight of methylol urea are available for the reaction until the ammonia has practically disappeared from the solution and a slightly alkaline solution is formed of an ammonia methylol urea compound of which the ammonia is chemically combined in the ratio of ⅓ mol to 2 mols of methylol urea and which is free of secondary reaction products.

2. In a process for the manufacture of water soluble hardenable urea resins the step of reflux condensing methylol ureas in the presence of water with approximately 3 parts by weight of ammonia per one mol weight of methylol urea until the ammonia has practically disappeared from the solution and a slightly alkaline solution is formed of an ammonia methylol urea compound of which the ammonia is chemically combined in the ratio of ⅓ mol to 2 mols of methylol urea and which is free of secondary reaction products.

3. In a process for the manufacture of water soluble hardenable urea resins the step of agitating vigorously at normal room temperature methylol ureas in the presence of water with approximately 3 parts by weight of ammonia per one mol weight of methylol urea until the ammonia has practically disappeared from the solution and a slightly alkaline solution is formed of an ammonia methylol urea compound of which the ammonia is chemically combined in the ratio of ⅓ mol to 2 mols of methylol urea and which is free of secondary reaction products.

4. In a process for the manufacture of water soluble hardenable urea resins the step of refluxing urea in the presence of water with hexamethylene tetramine at the ratio of one methylene group to each molecule of urea whereby methylol urea is formed, reducing the ammonia contents of the solution while maintaining the same at a constant volume to approximately 3 parts by weight of ammonia per one mol weight of methylol urea until the ammonia has practically disappeared from the solution and a slightly alkaline solution is formed of an ammonia methylol urea compound of which the ammonia is chemically combined in the ratio of ⅓ mol to 2 mols of methylol urea and which is free of secondary reaction products.

5. A water soluble, hardenable synthetic urea resin obtained by the process of claim 1.

FRITZ POLLAK.